US006099938A

United States Patent [19]
Stoyanovich

[11] Patent Number: 6,099,938
[45] Date of Patent: Aug. 8, 2000

[54] LEATHER PIECE LAMINATION TO LOW MELT FILM ADHESIVE

[75] Inventor: Matthew Stoyanovich, Amherstburg, Canada

[73] Assignee: Advanced LaminationTechnoloties Ltd., Windsor, Canada

[21] Appl. No.: 09/054,923

[22] Filed: Apr. 3, 1998

[51] Int. Cl.[7] ...................................................... B32B 3/10
[52] U.S. Cl. .......................... 428/151; 428/224; 428/280; 428/284; 428/290; 156/285; 156/311
[58] Field of Search ...................................... 428/310, 315, 428/473, 920, 292, 288, 293, 313, 337, 280, 284, 290, 224; 156/153, 155, 322, 281, 285, 311; 427/184, 155

[56] References Cited

U.S. PATENT DOCUMENTS

| | | | |
|---|---|---|---|
| 3,755,024 | 8/1973 | Grapin | 156/57 |
| 3,770,562 | 11/1973 | Newman | 161/156 |
| 3,857,745 | 12/1974 | Grausch et al. | 156/83 |
| 4,061,822 | 12/1977 | Brodnyan et al. | 428/315 |
| 4,073,998 | 2/1978 | O'Connor . | |
| 4,504,536 | 3/1985 | Wong | 428/151 |
| 4,692,373 | 9/1987 | Welz et al. | 428/285 |
| 4,746,385 | 5/1988 | Wagner et al. . | |
| 4,923,732 | 5/1990 | Schaefer | 428/151 |
| 5,100,724 | 3/1992 | LaMarca et al. . | |
| 5,173,355 | 12/1992 | Vock et al. | 428/219 |
| 5,242,750 | 9/1993 | Wagner et al. | 428/316 |
| 5,525,411 | 6/1996 | Stewart et al. | 428/236 |
| 5,565,259 | 10/1996 | Juriga | 428/138 |
| 5,582,906 | 12/1996 | Romesberg et al. . | |

*Primary Examiner*—Merrick Dixon
*Attorney, Agent, or Firm*—Howard & Howard

[57] ABSTRACT

A leather and low melt thermoplastic adhesive laminate and a fixture which permits the laminate to be produced in a high volume, less expensive manner is disclosed. The disclosed laminate includes a leather layer cohesively bonded to a low melt thermoplastic adhesive layer and may include a scrim layer in addition to the low melt thermoplastic adhesive layer. A method is disclosed which permits for the rapid assembly of the laminate using pre-die-cut pieces of leather, low melt thermoplastic adhesive, and scrim.

21 Claims, 10 Drawing Sheets

LEATHER PIECE LAMINATION TO LOW MELT FILM ADHESIVE

BACKGROUND OF THE INVENTION

1. Field of the Invention

This invention relates generally to dry lamination, and in particular to dry lamination of pre-die-cut leather to adhesive films in an industrial, high speed automated setting.

2. Description of Related Art

Laminated materials have particular utility in the automotive industry for interior trim applications such as armrests, consoles, headrests and seating applications. In this market, utilization of industrial high speed automated equipment is required due to the high volume requirements of the products involved. Currently, the most advanced lamination equipment involves the utilization of a flat bed laminator set on a continuous belt conveyor. The flat bed laminator heats the two materials being laminated initially, applies pressure to the materials, and then cools the materials. The end product of this lamination process is a lamination of the materials that have been fed through the laminator. Using the typical high-speed lamination technology to date, the materials are first laminated and then die cut to the proper contour. This lamination technology has been used to produce leather laminates, but there are disadvantages to applying this process to the lamination of leather.

One of the disadvantages is that in a typical flat bed lamination the entire surface of the piece of leather is laminated which results in wasted leather and lamination material when the desired end product is later die cut from the leather laminate. The traditional manner of reducing wasted leather and other lamination materials has been to die cut all the layers of the laminate in advance of feeding them through the flat bed laminator. This alternative has the disadvantage of being very labor intensive. It is labor intensive because a laborer must carefully position the materials to be laminated together with appropriate alignment of all the edges of the die cut material prior to feeding the materials into the flat bed laminator. This process results in increased labor costs, waste due to human error, and a reduction in quality due to human error. In addition, because the materials are already die cut, it has been difficult to perform this alignment in an automated process.

A second difficulty associated with he use of leather laminates in automotive applications occurs when the leather laminate is tightly wrapped over rigid, energy absorbing surfaces such as armrests, consoles, headrests, and seating applications. In these applications, there is a natural tendency for the leather to expand and contract under normal operating conditions. In particular, when the interior temperature of the car is elevated above approximately 79° C., as occurs during the summer months, there is considerable expansion of the leather. The result of this expansion of the leather with traditional leather laminates is a "baggy" appearance to the leather covered item. This appearance is unacceptable to the end customer.

Thus, it is desirable to provide a method for permitting the rapid production of leather laminates in a highly automated system. It is also desirable to provide a method which utilizes pre-die-cut lamination layers in order to reduce waste. It is furthermore desirable to provide a method for producing a leather laminate which will not present a "baggy" appearance over time as a result of exposure to normal operating conditions within a vehicle.

BRIEF SUMMARY OF THE INVENTION

In general terms, this invention provides a fixture and a method which permits rapid and repeatable alignment of pre-die-cut layers of a laminate. The fixture can be rapidly inserted into a lamination press to produce a finished leather laminate. In addition, the method provides a means for producing a leather laminate having an adhesive layer which stabilizes the leather under normal operating conditions within a vehicle to prevent the development of a "baggy" appearance. Specifically, the adhesive layer is cohesively bonded to the leather layer and forms an adhesive bond with the portion of the vehicle that the adhesive layer covers when the interior temperature of the vehicle exceeds the melting point temperature of the adhesive layer. Additionally, a layer of scrim can be incorporated into the laminate to further stabilize the leather.

The method of the present invention comprises the steps of positioning a piece of low melt thermoplastic adhesive within a cutout of a fixture, the cutout having a predetermined shape. A piece of leather having the pre-determined shape is positioned within the cutout and against the piece of low melt thermoplastic adhesive. The fixture is then positioned within a lamination press. The fixture is compressed to a pre-determined height and heat is applied to the fixture thereby forming a cohesive bond between the piece of low melt thermoplastic adhesive and the leather to produce a leather and adhesive laminate. The method may further include a step of first positioning a piece of scrim within the cutout of the fixture followed by the piece of low melt thermoplastic adhesive and the piece of leather. This alternative produces a laminate of scrim, low melt thermoplastic adhesive, and leather.

The laminate of the present invention comprises a layer of leather having a finished side and an unfinished side. A layer of low melt thermoplastic adhesive is bonded to the unfinished side of the leather. The laminate may also include a layer of scrim with the layer of low melt thermoplastic adhesive sandwiched between the layer of scrim and the layer of leather. These and other features and advantages of this invention will become more apparent to those skilled in the art from the following detailed description of the presently preferred embodiment. The drawings that accompany the detailed description can be described as follows.

DETAILED DESCRIPTION OF THE INVENTION

Figure 1:
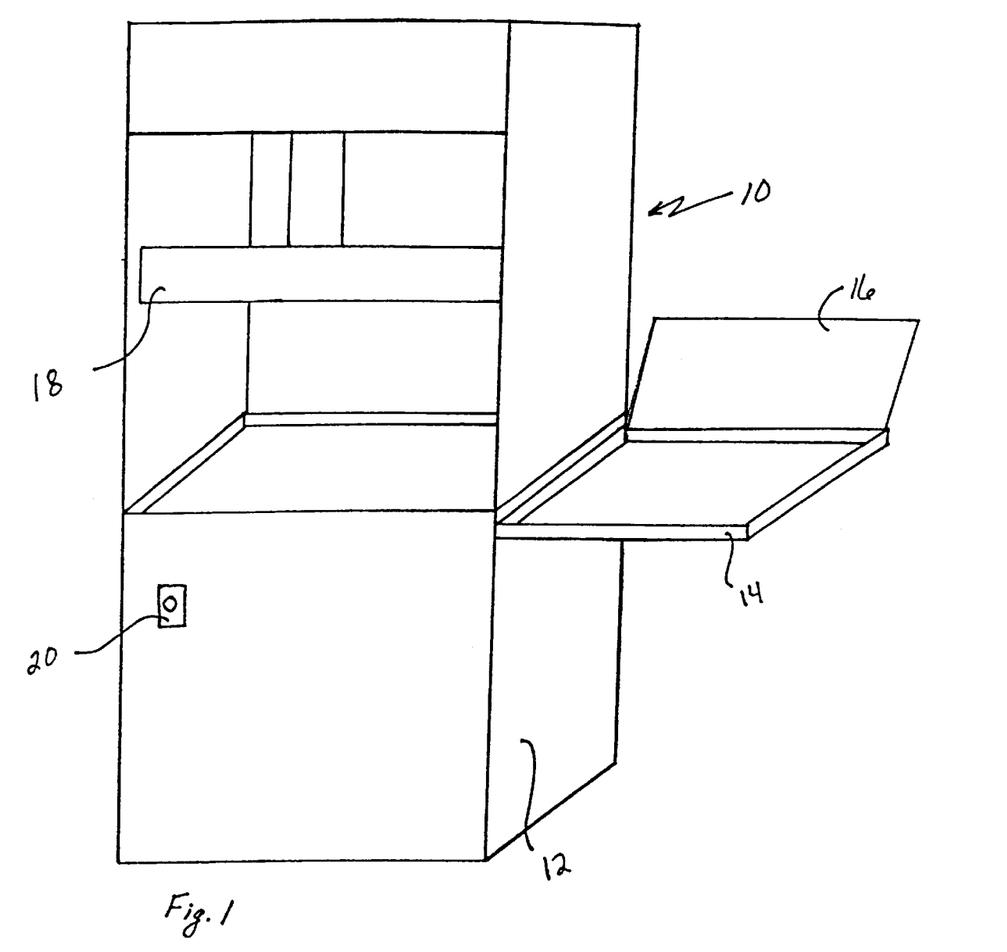
FIG. 1 is a schematic illustration of a lamination press.

FIG. 1 is a schematic representation of a lamination press shown generally at 10. The lamination press 10 includes a base 12 and a fixture bed 14. A lid 16 is pivotally mounted to a side of the fixture bed 14. The fixture bed 14 is slidably received in a slot (not shown) in the base 12 of the lamination press 10. A press 18 is mounted above the base 12. A press activation switch 20 is mounted on the base 12. Closure of the lid 16 permits the fixture bed 14 to be received into the base 12. The lamination press 10 is only shown schematically as will be understood by one of ordinary skill in the art. The laminator press 10 further includes conventional heating means (not shown) and a vacuum means (not shown) for providing a vacuum in the fixture bed 14.

Figure 2:
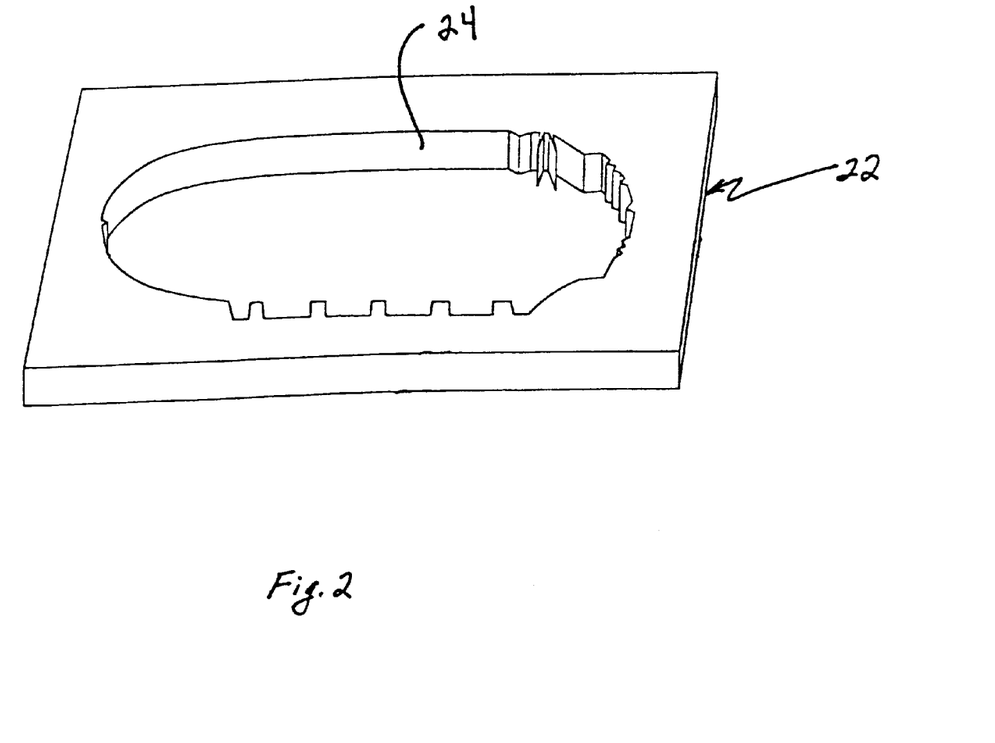
FIG. 2 is a perspective view of a fixture designed in accordance with the present invention.

In FIG. 2, a perspective view of a fixture designed according to the present invention is shown generally at 22. A cutout 24 is located within the fixture 22 and the cutout 24 has a pre-determined contour that corresponds to the desired contour of the final laminate.

Figure 3:
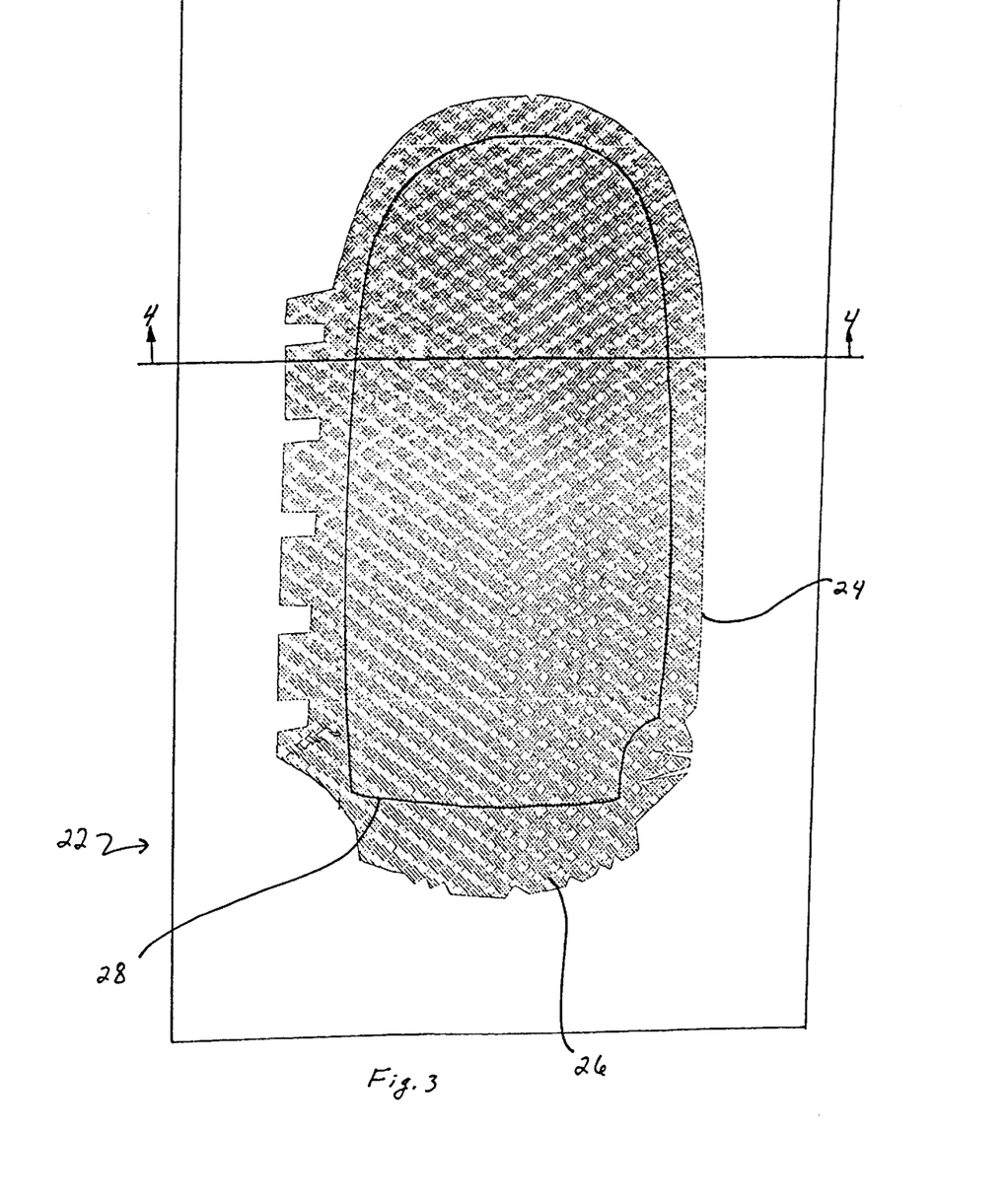
FIG. 3 is a top plan view of the fixture.

In FIG. 3, a top plan view of the fixture 22 is shown. A heat resistant layer 26 forms the bottom of the fixture 22. A locator line 28 is inscribed on the heat resistant layer 26.

Figure 4:
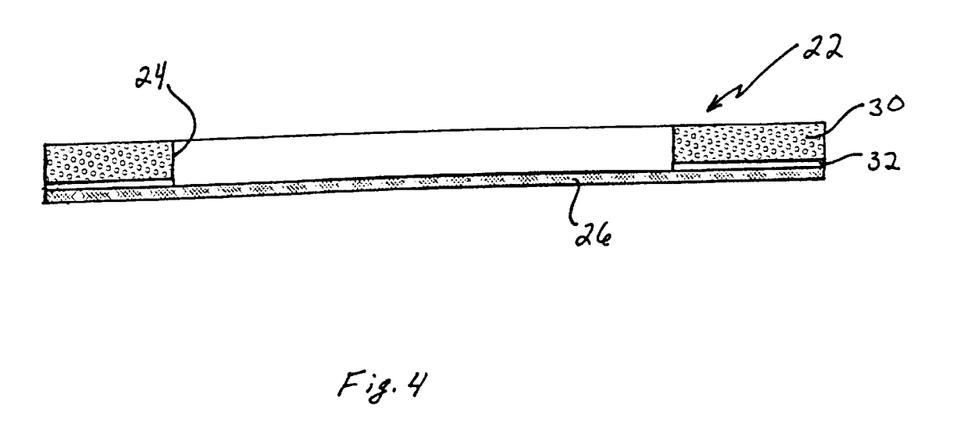
FIG. 4 is a cross-sectional view along lines 4—4 of FIG. 3.

FIG. 4 is a cross-sectional side view of the fixture 22 shown in FIG. 3 along line 4—4. A silicon foam form 30 is secured to the heat resistant layer 26 by means of a pressure sensitive adhesive 32. The silicon foam form 30 includes the cutout 24. Preferably, the heat resistant layer 26 comprises polytetrafluorethylene-coated fiberglass cloth. The heat resistant layer 26 does permit some heat to pass through itself. The heat resistant layer 26 in combination with the silicon foam 30 provide a fixture 22 that is heat resistant to 200° C. and that maintains its dimensional stability at high temperature, under pressure, and during cooling cycles. As will be understood by one of ordinary skill in the art, the outer dimensions of the fixture 22 could take any shape and the thickness of the fixture could be varied to match the requirements of the laminate being produced. The fixture 22 is received in the fixture bed 14. As will be understood of one of ordinary skill in the art, the fixture bed 14 could be designed to accommodate a number of fixtures 22 and each of the fixtures 22 could have the same contour to their respective cutout 24 or different contours. In addition, a single fixture 22 could include a number of cutouts 24.

Figure 5:
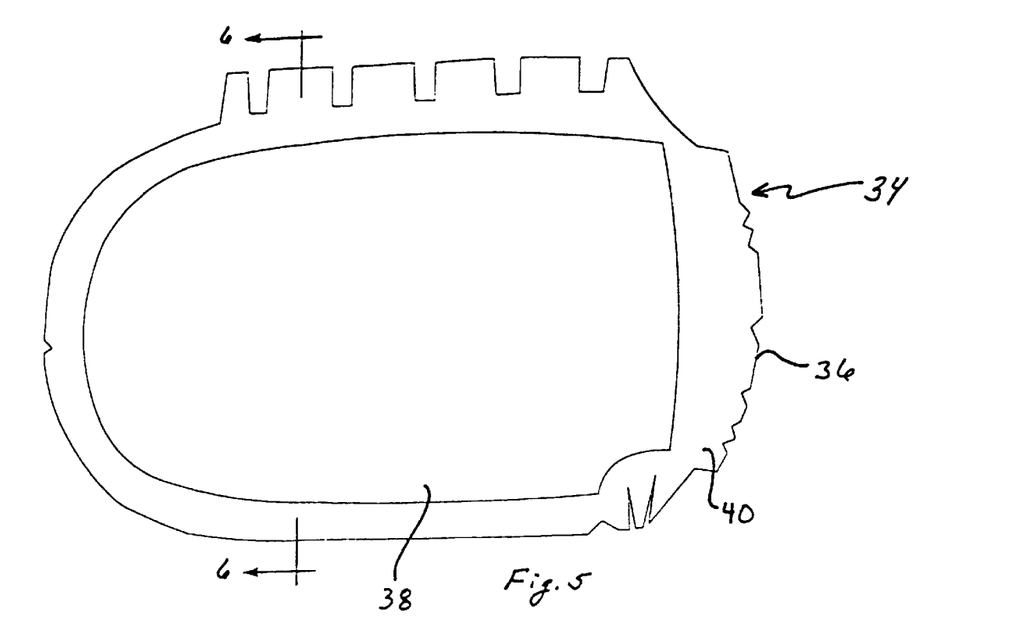
FIG. 5 is a bottom view of a leather and low melt thermoplastic adhesive laminate designed according to the present invention.

In FIG. 5, a bottom view of a leather and low melt thermoplastic adhesive laminate designed according to the present invention is shown generally at 34. A leather layer 36 is cohesively bonded to a low melt thermoplastic adhesive layer 38. The low melt thermoplastic adhesive layer 38 is bonded to an unfinished side 40 of the leather layer 36. The contour of the leather layer 36 corresponds to the contour of the cutout 24. The contour of the low melt thermoplastic adhesive layer 38 corresponds to the contour of the locator line 28 inscribed on the heat resistant layer 26. Preferably, the leather layer 36 and the low melt thermoplastic adhesive layer 38 are die-cut prior to formation of the laminate 34. A cohesive bond as used in the specification and the claims means a bond having a strength that exceeds the force required to tear the leather layer 36 or the thermoplastic adhesive layer 38. In FIG. 5, the adhesive layer 38 is shown as partially covering the leather layer 36. As will be understood by one of ordinary skill in the art, the adhesive layer 38 could also be die cut with a contour that corresponds to the contour of the cutout 24.

Figure 6:
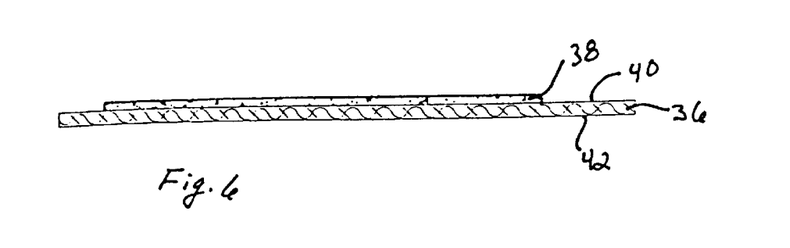
FIG. 6 is a cross-sectional end view of the leather and low melt thermoplastic adhesive laminate along lines 6—6 of FIG. 5.

FIG. 6 is a cross-sectional view along lines 6—6 of FIG. 5. The leather layer 36 also includes a finished side 42 opposite the unfinished side 40.

The low melt thermoplastic adhesive layer 38 can either be in the form of a web or a film. Preferably, the adhesive layer 38 is non-reactive, meaning it is not affected by humidity. The preferable properties of the low melt thermoplastic adhesive layer 38 are that it have a melting point temperature near the ambient interior temperature of an automobile during the summer months, namely approximately 79° C. If the low melt thermoplastic adhesive layer 38 is in the form of a film, it is preferable that it be impermeable. Examples of suitable low melt thermoplastic adhesive layers 38 include a film such as polyurethane 3218 available from Bemis Associates, Inc., Shirley, Mass.; a web such as Bostick polyester; or a polyamide web such as Spun-Fab™. In this embodiment, the most preferred adhesive layer 38 is a polyurethane such as polyurethane 3218, which has a melting point temperature of approximately 88° C.

The method of the present invention includes the following steps. First, the leather layer 36 and the low melt thermoplastic adhesive layer 38 are die-cut to the appropriate contours. Second, the fixture 22 is placed in the fixture bed 14 with the heat resistant layer 26 oriented downwardly against the fixture bed 14. Then, a vacuum is applied to the fixture bed 14 and the fixture 22 through a vacuum means (not shown). The die-cut low melt thermoplastic adhesive layer 38 is oriented within the cutout 24 on the locator line 28. The vacuum maintains the low melt thermoplastic adhesive layer 38 in position within the cutout 24. Next, the leather layer 36 is placed in the cutout 24 with the unfinished side 40 against the low melt thermoplastic adhesive layer 38. The lid 16 is closed against the fixture bed 14 and the fixture bed 14 is slid into the base 12. Press 18 compresses the fixture 22, preferably to a height of between 3 millimeters to 3.5 millimeters. Then, heat is applied to the fixture 22, preferably from both the side adjacent the press 18 and from the side of the fixture 22 adjacent the base 12. The heat applied to the side adjacent to the press 18 is preferably approximately 95° C. and the heat applied to the side of the fixture 22 adjacent the base 12 is preferably in the range between 110° and 190° C. The heat applied to the side of the fixture 22 adjacent the base 12 should not exceed 200° C. The typical dwell time is 30 seconds. The finished laminate 34 is then removed from the fixture 22 and allowed to cooled. It will be understood of one having ordinary skill in the art that the dwell time, degree of compression, and heat applied to the two sides of the fixture 22 will vary depending on the particular low melt thermoplastic adhesive layer 38 being used in the method. In addition, the heat applied adjacent the leather layer 36 must be kept sufficiently low to prevent scorching of the leather layer 36.

Figure 7:
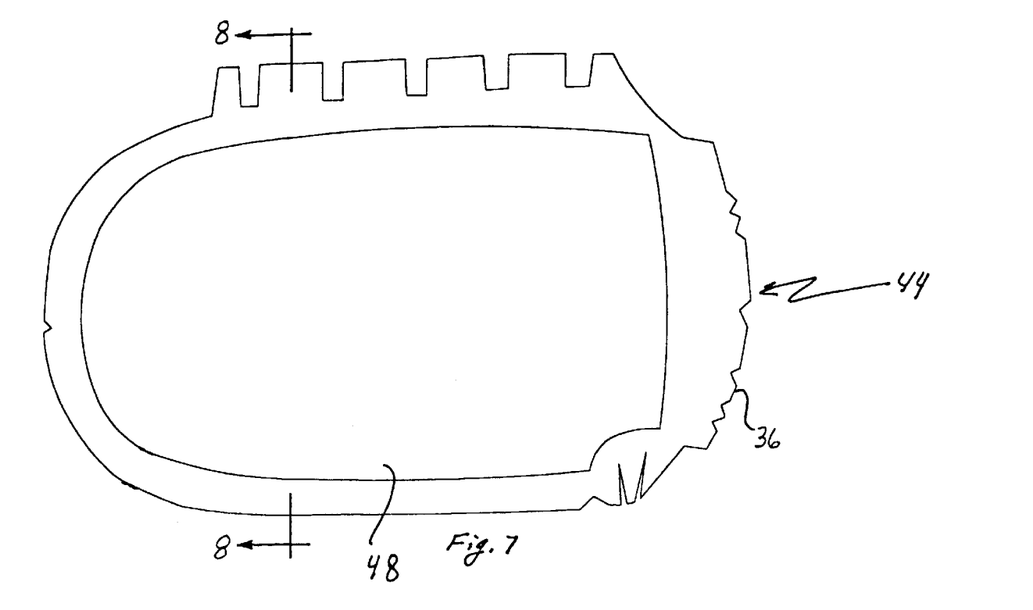
FIG. 7 is a bottom view of a leather, low melt thermoplastic adhesive, and scrim laminate designed according to the present invention.
Figure 8:
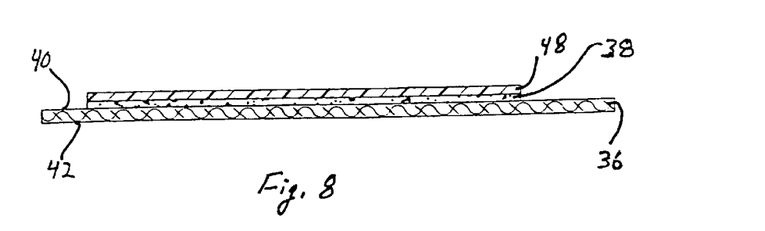
FIG. 8 is a cross-sectional side view of the leather, low melt thermoplastic adhesive, and scrim laminate along lines 8—8 of FIG. 7.

In FIG. 7, a bottom plan view of a leather, low melt thermoplastic adhesive, and scrim laminate is shown generally at 44. FIG. 8 is a cross-sectional view along lines 8—8 of FIG. 7. The low melt thermoplastic adhesive layer 38 is sandwiched between a scrim layer 48 and the leather layer 36. The leather layer 36 includes an unfinished side 40 and a finished side 42.

The method for forming the leather, low melt thermoplastic adhesive, and scrim laminate 44 is similar to the method for producing the leather and low melt thermoplastic adhesive laminate 34 described above. The only difference is that the scrim layer 48 is placed in the fixture 22 before placement of the low melt thermoplastic adhesive layer 38 in the fixture 22. In this embodiment it is most preferable to use a web adhesive having a melting point temperature between 90° C.–115° C. Examples of the most preferred web adhesives include Bostic polyester web and Spun-Fab™, a polyamide web adhesive. As discussed below in reference to FIG. 9, it is most preferred that the scrim layer 48 be laminated to the adhesive layer 38 in a roll to roll lamination step initially. The laminate is then die-cut to shape and then oriented in the fixture 22.

Figure 9:
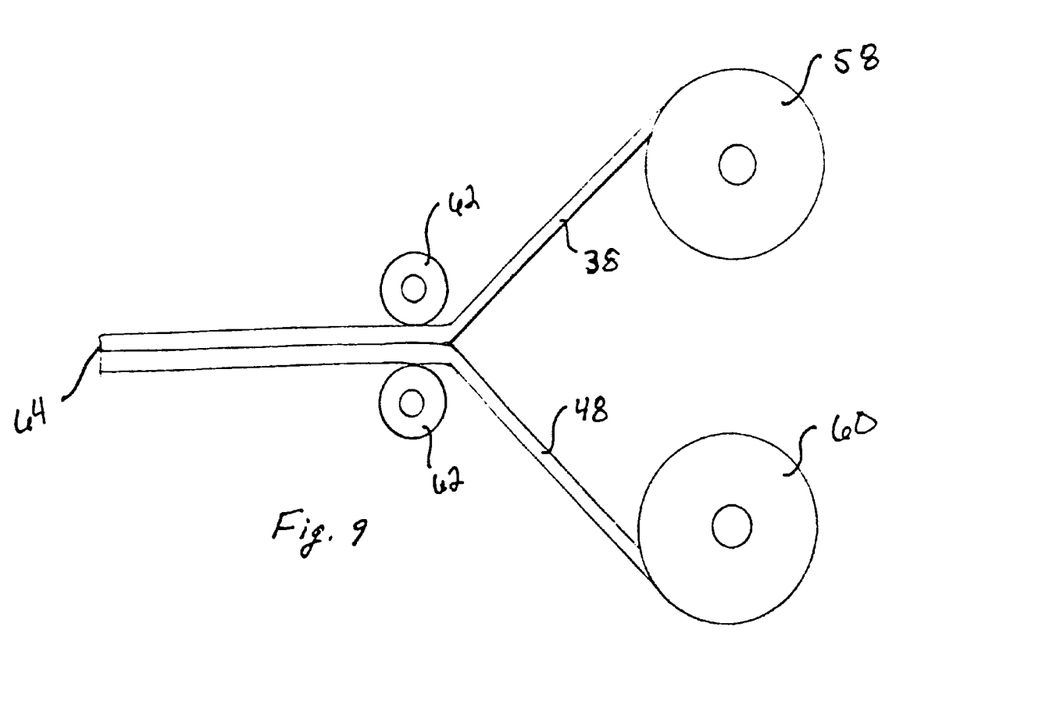
FIG. 9 is a schematic illustration of bonding the low melt thermoplastic adhesive to the scrim.

In FIG. 9, low melt thermoplastic adhesive layer 38 from a roll 58 and a scrim layer 48 from a roll 60 are fed through a pair of heat rollers 62 to produce a bonded laminate of scrim and adhesive 64. The heat rollers 62 are maintained at a temperature below the melting point temperature of the adhesive layer 38 but above the softening point temperature of the adhesive layer 38. Thus, the adhesive layer 38 is maintained intact but is somewhat tacky and capable of bonding to the scrim layer 48. Typically, the heat rollers 62 are kept at a temperature between 45° C. and 55° C. for the low melt thermoplastic adhesive layers 38 discussed above. The bonded scrim and adhesive laminate 64 can then be die-cut in a single procedure to eliminate the need to separately die-cut the adhesive layer 38 and the scrim layer 48. Most preferably, the scrim layer 48 is a non-woven, non-stretchable polyester scrim which is either spun-bonded or point bonded. In this embodiment, the adhesive layer 38 is most preferably either a polyester web or a polyamide web such as Spun-Fab™.

Figure 10:
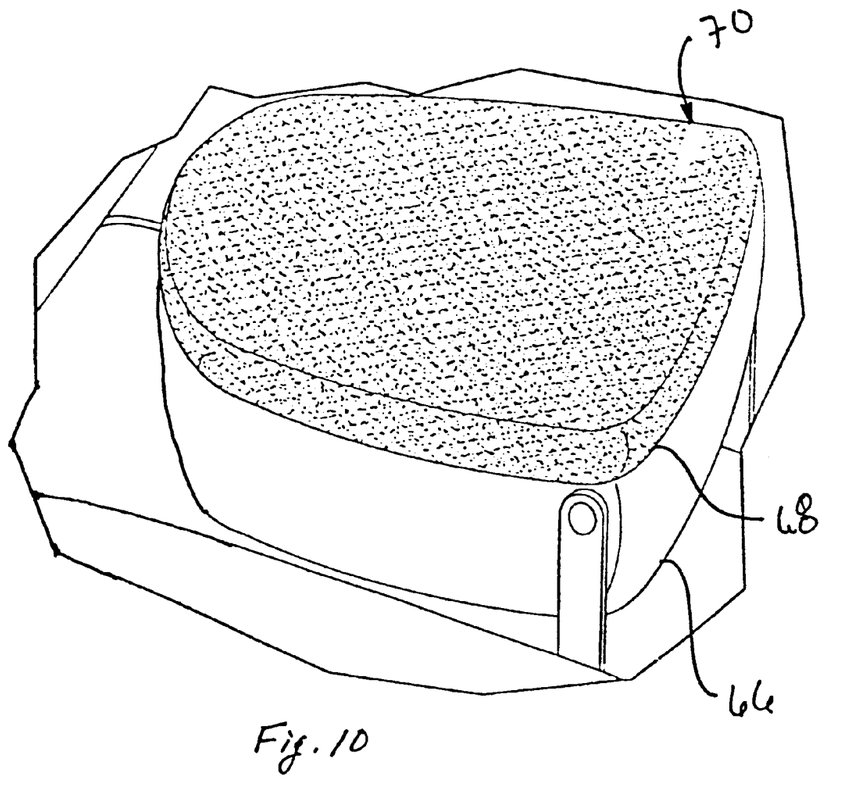
FIG. 10 is a schematic illustration of a leather laminate on a console of a vehicle.

In FIG. 10, a console 66 is shown within the interior of a vehicle (not shown). The console 66 has a foundational surface 68 to which a laminate, shown generally at 70, of one of the types discussed above, is secured. The laminate 70 is initially secured to the foundational surface 68 of the console 66 by conventional means as will be understood by one of ordinary skill in the art. When the interior temperature of the vehicle approaches the melting point temperature of the low melt thermoplastic adhesive layer 38 the low melt thermoplastic adhesive layer 38 begins to become "tacky" and forms an adhesive bond with the foundational surface 68. This adhesive bond is maintained after the interior temperature of the vehicle subsequently drops below the melting point temperature of the low melt thermoplastic adhesive layer 38. Thus, the leather layer 36 maintains a tight appearance on the console 66 despite expansion and contraction of the leather layer 36 in response to changes in the temperature within the interior of the vehicle. Addition of the scrim layer 48 to the laminate 44 enhances the ability of the adhesive layer 38 to maintain the leather layer 36 in a tight conformance to the console 66. The cohesive bond which forms between the leather layer 36 and the low melt thermoplastic adhesive layer 38 is greater than the tear strength of the leather layer 36 or the adhesive layer 38. The adhesive bond which forms between the low melt thermoplastic adhesive layer 38 and the foundational surface 68 when the interior temperature of the vehicle approaches a melting point temperature of the low melt thermoplastic adhesive layer 38 permits limited movement of the leather layer 36 relative to the console 66.

Figure 11:
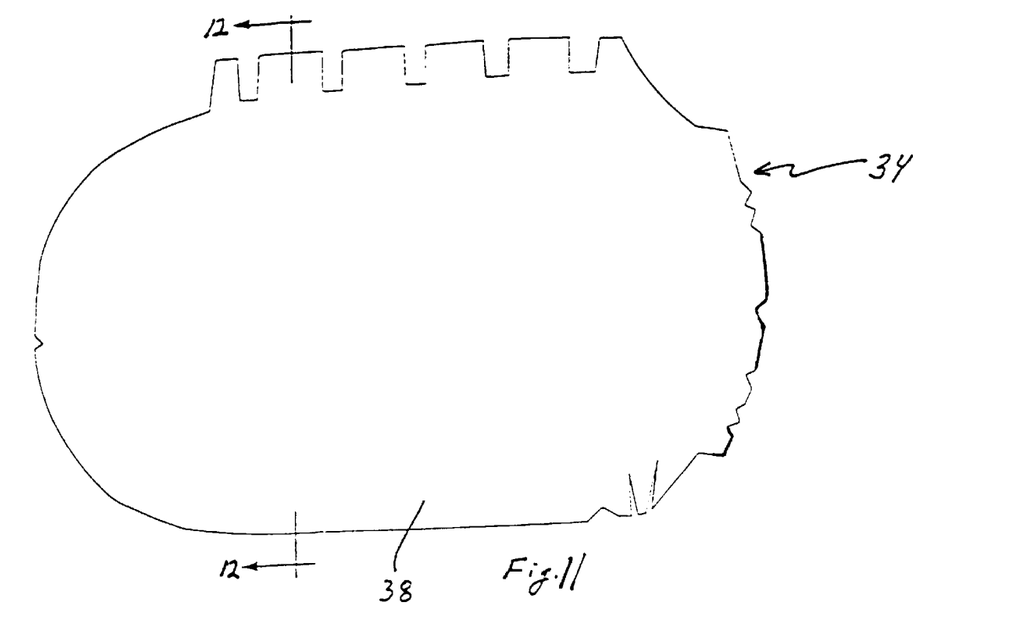
FIG. 11 is a bottom view of a leather and low melt thermoplastic adhesive laminate designed according to the present invention.
Figure 12:
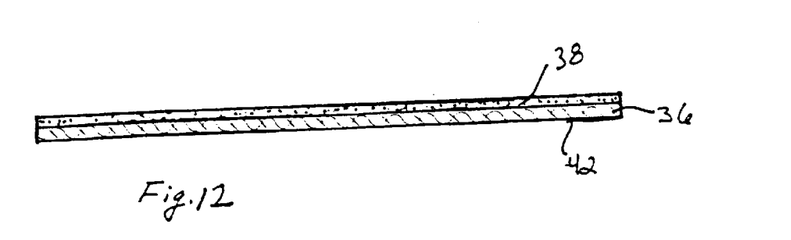
FIG. 12 is a cross-sectional end view of the leather and low melt thermoplastic adhesive laminate along lines 12—12 of FIG. 11.

In FIG. 11, a bottom view of the leather and low melt thermoplastic adhesive laminate designed according to the present invention is shown generally at 34. The only difference between the laminate shown in FIG. 11 and FIG. 5 is that in FIG. 11, the adhesive layer 38 has a contour that corresponds to the predetermined contour of the cutout 24. In FIG. 12, a cross-sectional end view along lines 12—12 of FIG. 11 is shown.

Figure 13:
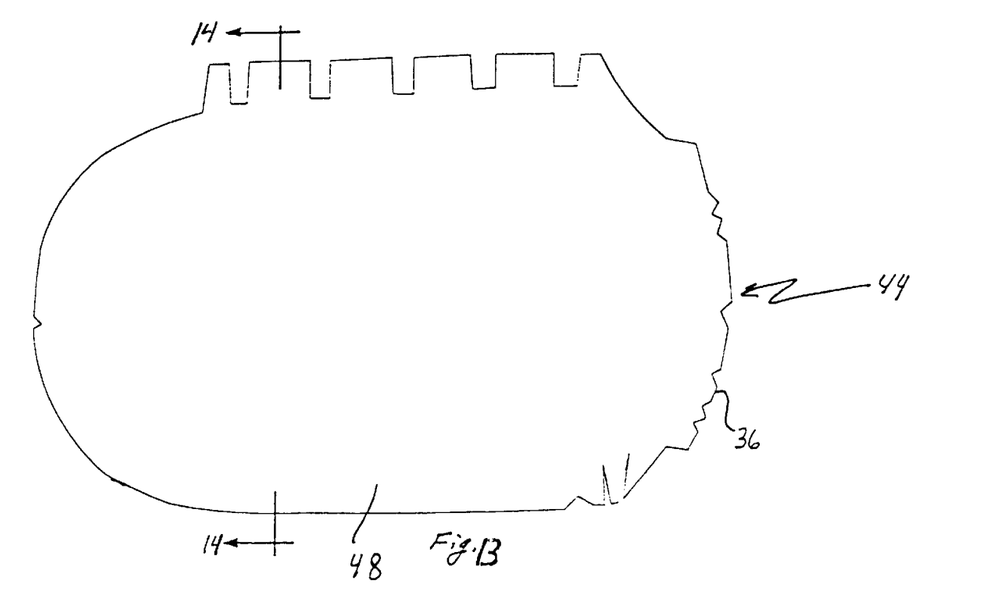
FIG. 13 is a bottom view of a leather, low melt thermoplastic adhesive, and scrim laminate designed according to the present invention.
Figure 14:
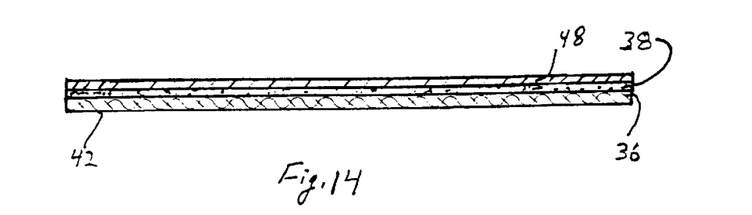
FIG. 14 is a cross-sectional side view of the leather, low melt thermoplastic adhesive, and scrim laminate along lines 14—14 of FIG. 13.

In FIG. 13, a bottom plan view of a leather, low melt thermoplastic adhesive, and scrim laminate is shown generally at 44. The only difference between the laminate shown in FIG. 13 and FIG. 7 is that in FIG. 13 the scrim layer 48 and the adhesive layer 38 have a contour that corresponds to the pre-determined contour of the cutout 24. FIG. 14 is a cross-sectional end view along lines 14—14 of FIG. 13.

The foregoing description is exemplary rather than limiting in nature. Variations and modifications to the disclosed embodiment may become apparent to those skilled in the art and do come within the scope of this invention.

Accordingly, the scope of legal protection afforded this invention can only be determined by studying the following claims.

What is claimed is:

1. A method of laminating a low melting thermoplastic adhesive layer to a piece of leather layer, said method comprising the steps of:
    (a) positioning a piece of a low melting thermoplastic adhesive layer within a cutout of a fixture, the cutout having a pre-determined contour;
    (b) positioning said piece of leather layer having the pre-determined contour within the cutout and against said piece of said low melting thermoplastic adhesive layer,
    (c) positioning the fixture with said piece of said low melting thermoplastic adhesive layer and said piece of leather layer within a lamination press;
    (d) compressing the fixture in the lamination press to a pre-determined height; and
    (e) applying heat to the fixture thereby forming a cohesive bond between said piece of said low melting thermoplastic adhesive layer and the piece of leather layer.

2. A method as recited in claim 1 wherein a piece of scrim layer is positioned within the cutout, with the piece of thermoplastic adhesive layer sandwiched between the piece of scrim layer and the piece of leather layer.

3. A method as recited in claim 2 wherein the piece of scrim layer is bonded to the piece of thermoplastic adhesive layer prior to positioning the scrim layer and the thermoplastic adhesive layer in the cutout by placing the piece of scrim layer against the piece of thermoplastic adhesive layer and heating the thermoplastic adhesive layer to a temperature that is below the melting point temperature of the thermoplastic adhesive layer and equal to or above the softening point temperature of the thermoplastic adhesive layer, thereby bonding the scrim layer to the thermoplastic adhesive layer.

4. A method as recited in claim 3 wherein the thermoplastic adhesive layer and the scrim layer are bonded to each other by heating them to a temperature between 45° C. and 55° C.

5. A method as recited in claim 3 wherein the scrim layer with the bonded thermoplastic adhesive layer is die cut prior to positioning the scrim layer with the bonded thermoplastic adhesive layer in the cutout.

6. A method as recited in claim 5 wherein the scrim layer with the bonded thermoplastic adhesive layer is die cut to a contour that corresponds to the pre-determined contour.

7. A method as recited in claim 1 wherein the low melt thermoplastic adhesive layer comprises a thermoplastic adhesive layer having a melting point temperature between 65° C. and 85° C.

8. A method as recited in claim 1 wherein the low melt thermoplastic adhesive layer is selected from the group consisting of polyurethane, polyester, and polyamide.

9. A method as recited in claim 1 wherein the low melt thermoplastic adhesive layer and the leather layer are die cut prior to positioning them within the cutout.

10. A method as recited in claim 1 wherein the heating step further includes applying a first heat to the side of the fixture adjacent to the leather layer and a second heat to the side of the fixture adjacent to the thermoplastic adhesive layer, the first heat being of a lower temperature than the second heat.

11. A method as recited in claim 10 wherein the first heat is approximately 95° C. and the second heat is between 110° C. and 190° C.

12. A method as recited in claim 1 wherein the fixture is compressed to a predetermined height between 3.0 mm and 3.5 mm.

13. A method as recited in claim 2 wherein the scrim layer comprises a non-woven polyester.

14. A method as recited in claim 1 wherein the piece of a low melting thermoplastic adhesive is die cut to have a contour that corresponds to the predetermined contour.

15. A laminate comprising:
 a leather layer having a finished side and an unfinished side;
 a low melt thermoplastic adhesive layer;
 a non-woven scrim layer comprising a polyester, said scrim layer being one of spun-bonded or point-bonded;
 said low melt thermoplastic adhesive layer sandwiched between said non-woven scrim layer and said leather layer; and
 said low melt thermoplastic adhesive layer cohesively bonded to said unfinished side of said leather layer and bonded to said scrim layer.

16. A laminate as recited in claim 15 wherein said non-woven scrim layer is bonded to said low melt thermoplastic adhesive layer prior to bonding said low melt thermoplastic adhesive layer to said leather layer.

17. A laminate as recited in claim 15 wherein said low melt thermoplastic adhesive layer comprises one of a film or a web.

18. A laminate as recited in claim 15 wherein a melting point temperature of said low melt thermoplastic adhesive layer is between 65° C. and 85° C.

19. A laminate as recited in claim 15 wherein said low melt thermoplastic adhesive layer is selected from the group consisting of polyurethane, polyester, and polyamide.

20. An interior part of a vehicle comprising:
 a leather layer having a finished side and an unfinished side;
 a low melt thermoplastic adhesive layer, said low melt thermoplastic adhesive layer cohesively bonded to said unfinished side of said leather layer;
 an interior part having a foundational surface;
 a scrim layer sandwiched between said foundational surface and said low melt thermoplastic adhesive layer; and
 said low melt thermoplastic adhesive layer adhesively bonded to said foundational surface and said scrim layer.

21. An interior part of a vehicle as recited in claim 20 wherein said low melt thermoplastic adhesive layer is selected from the group consisting of polyurethane, polyester, and polyamide.

* * * * *